United States Patent [19]
Bobard

[11] 3,953,050
[45] Apr. 27, 1976

[54] LONGITUDINAL MEMBER FOR THE CHASSIS OF A STRADDLE VEHICLE

[75] Inventor: Emile Bobard, Beaune, France
[73] Assignee: Bobard Jeune, Beaune, France
[22] Filed: Mar. 13, 1975
[21] Appl. No.: 558,077

[52] U.S. Cl. .............................. 280/760; 180/1 F
[51] Int. Cl.² ........................................ B60R 11/00
[58] Field of Search .......... 280/150 F, 150 R, 32.5, 280/34 R; 180/1 F

[56] References Cited
UNITED STATES PATENTS

| | | | |
|---|---|---|---|
| 1,596,537 | 8/1926 | Hintz | 280/150 F |
| 2,695,179 | 11/1954 | Fancsali | 280/32.5 |
| 2,798,732 | 7/1957 | Craig | 280/32.5 |
| 3,033,303 | 5/1962 | Weekly | 280/32.5 |

FOREIGN PATENTS OR APPLICATIONS

| | | | |
|---|---|---|---|
| 1,448,089 | 5/1965 | France | 280/34 R |

Primary Examiner—Robert R. Song

[57] ABSTRACT

A longitudinal member is used for bracing the lower parts of the legs of the front and rear wheels on one side of the chassis of a straddle vehicle and for the attachments of implements thereto; the front and rear parts of the longitudinal member are equipped with slide means adapted to be associated with steering means and means for vertical displacement fitted to the straddle vehicle.

5 Claims, 5 Drawing Figures

LONGITUDINAL MEMBER FOR THE CHASSIS OF A STRADDLE VEHICLE

The present invention relates to improvements to longitudinal members equipped with coupling means and designed for the chassis sides of straddle-trucks.

A longitudinal member of this kind is described in the certificate of first addition to French Patent No. 1,448,089 of May 14th, 1965 (No. 93,069 dated 6/3/67). It comprises a straight element designed to be located below the leg of the driving wheel on one side of the chassis of the straddle-truck, by hinging one of the ends thereof to one of the wheel legs on this side and to a steering means provided between the other end thereof and the other leg on this side.

Now, this way of hinging a longitudinal member of this kind is not suitable for a large number of ways of coupling implements which may be used in conjunction with a straddle-truck of this kind.

One object of the invention is to avoid the disadvantages of reduced vertical movements of coupling means when the latter are adjacent a hinge in a longitudinal member of this kind.

Another object of the invention is to ensure instantaneous and/or simultaneous couplings to the front, intermediate, or rear parts of a longitudinal member of this kind.

Another object of the invention is to permit height adjustments without any change in the attitude of a coupled device.

Another object of the invention is to make it possible to attach implements (hoeing-ploughs, seeders, etc.), the transverse measurements of which are greater than that of the straddle-chassis, the implements being located between the front and rear wheels of the chassis.

Another object of the invention is to provide for the coupling of short or long devices intended to travel above the rows in a cultivated field, the rows being of average height in relation to the straddle-height of the vehicle.

Still another object of the invention is to facilitate individual use, between the planted rows, of implements which it is desirable to locate equidistantly between the front and rear wheels on one side of the straddle-truck.

An important feature of the invention is a longitudinal member of the type described in the aforesaid patent, the front and rear parts of the member being equipped with means designed to cooperate with the steering means suitably provided for the two legs on one side of the straddle-truck chassis; means being provided for vertical movement of the member, and the member being equipped with coupling means.

According to the present invention, the front and rear parts of the longitudinal member are provided with sliding means associated with steering means, and means for vertical displacement provided on the straddle-truck, the displacement means being synchronized where coupling is carried out without any change in the attitude of the implements.

In one preferred embodiment of the invention, the longitudinal member comprises at least one longitudinal element, the length of which is adapted to the distance between the front and rear legs on one side of the straddle-truck chassis, the element to be located between the legs at various heights in relation to the lower ends of the side legs.

Other characteristics and advantages of the invention may be gathered from the following description in conjunction with the drawings attached hereto, both the description and the drawings being given as non-restrictive examples only. In the drawings.

Figure 1:
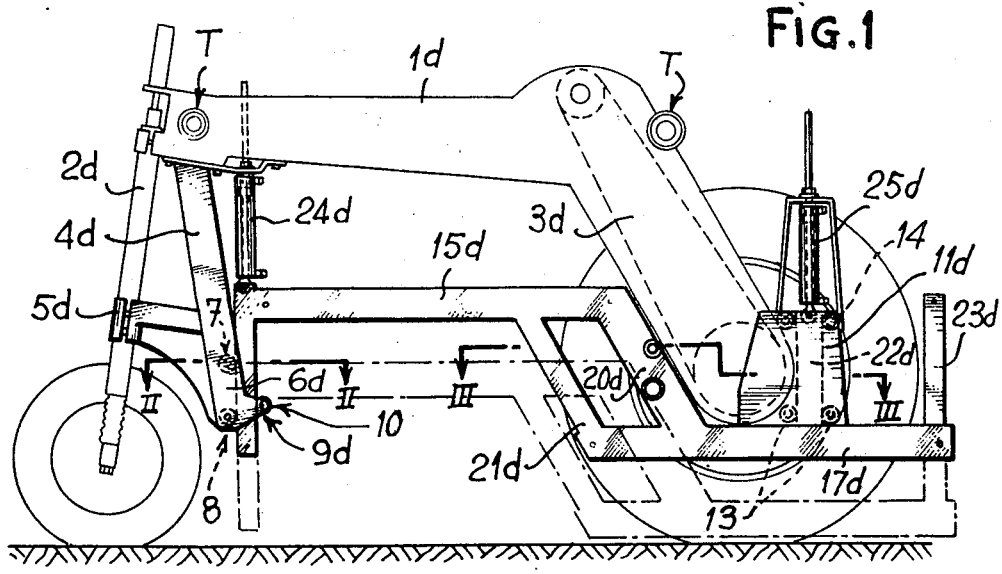
FIG. 1 is a vertical and longitudinal section through a straddle-truck equipped with the longitudinal member according to the invention.

FIG. 1 shows the right-hand "side" of a tractor straddle-chassis (the letter $d$ accompanying a reference numeral indicates that the element designated is on the right-hand side of the tractor while the letter $g$ indicates the left-hand side). It consists of a longitudinal member $1d$ assembled to the upper ends of a front leg $2d$ carried on a steering wheel, and of a rear leg $3d$ equipped with a driving wheel. This right side is assembled to the left side by means of T-shaped cross members mounted on longitudinal member $1d$ and on the rear face of leg $3d$.

A tubular member $4d$, of rectangular cross-section, is arranged frontwardly of the front face of leg $3d$, somewhat behind leg $2d$ and below longitudinal member $1d$, the upper part of member $4d$ being secured to member $1d$, while the central part thereof is suitably secured to leg $2d$ by means of a strut $5d$ and a bracket.

Element $4d$, thus arranged at an angle above the pivoting range of the steering wheel, extends in a downward direction to a level similar to that of the lower part of leg $3d$, and the lower part of the rear transverse wall thereof, which is located opposite leg $3d$, has been cut away. Thus, the cross-section of this lower part has the shape of a reclining U, with two lateral wings $6d$.

Two identical grooved rollers $7,8$ are mounted to rotate freely on two transverse axes arranged one above the other on wings $6d$ of the reclining U. Two small plate elements $9d$ are attached laterally to the lower part of each wing $6d$, the plates extending rearwardly thereof and forming two lateral lugs. A third roller 10 is mounted to rotate freely on a transverse axis secured to the lugs, at a height between rollers $7,8$.

Figure 2:
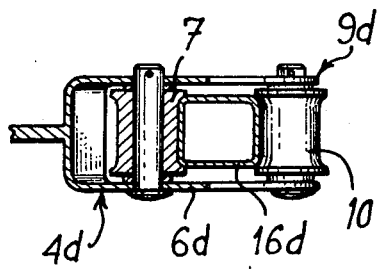
FIG. 2 is a detail of the longitudinal member illustrated in FIG. 1, in horizontal section, partly broken away, and to an enlarged scale.

These three rollers $7,8,10$ form a guide for a profiled sliding element which will be described hereinafter (FIG. 2).

Figure 3:
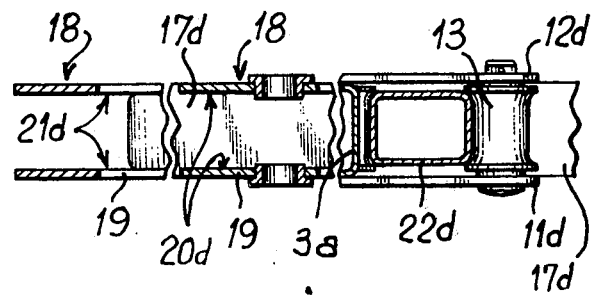
FIG. 3 is another detail of the longitudinal member illustrated in FIG. 1, in horizontal section, partly broken away, and to an enlarged scale.
Figure 4:
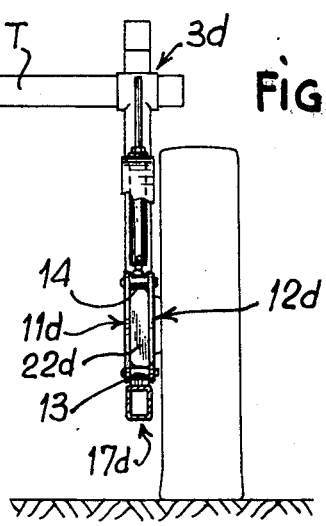
FIG. 4 is a cross elevation, seen from behind, of the right-hand side of the straddle-truck illustrated in FIG. 1.

Two identical rectangular elements $11d$, $12d$, cut from a rigid plate, are arranged laterally on each side of leg $3d$, the front parts of these elements being secured to the lower rear parts of the corresponding lateral surfaces of leg $3d$, thus forming, therebehind, two lateral flanges parallel with each other (FIGS. 1 and 3).

Four other identical grooved rollers $13,14$ are also mounted to rotate freely on axes arranged transversely in pairs and secured to flanges $11d$, $12d$, along the horizontal and transverse edges of a rectangular parallelepiped, in order to form, rearwardly of leg $3d$, another guide for a vertical slide similar to that mentioned above.

Another straight, profiled element $15d$, the length of which is of the order of, but less than, that of longitudinal member 1d, is arranged longitudinally, substantially horizontally, below the longitudinal member, and between legs 2d,3d; element 15d is tubular and of rectangular cross-section; furthermore, the transverse dimension thereof is approximately equal to the thickness of leg 3d.

The front end of element 15d is butt-welded to the upper part of the rear face of another profiled element 16d arranged vertically and running between rollers 7,8 and 10; the cross-section of element 16d fits the grooves in these rollers and the horizontal distance between roller 10 and rollers 7,8.

Another profiled element 17d, the cross-section of which is identical with that of element 15d, has a length of the order of magnitude of the diameter of the driving wheel of leg 3d, and is arranged approximately horizontally below the element 15d.

These elements 15d, 17d are united, in a manner known per se, by means of flat bars 18,19 forming two arms 20d, 21d spaced longitudinally in relation to each other.

These elements 18,19, made by cutting off the top and bottom ends of flat bars at an angle, are butt-welded to the upper and lower surfaces of elements 15d and 17d. Moreover, the elements are arranged in pairs, running respectively from the rear end of element 15d and from the front end of element 17d, each pair being spaced transversely to form arms 20d, 21d which are arranged at an angle similar to that of leg 3d.

A profiled element 22d, similar to element 16d and adapted to the dimensions of the horizontal section of the slide formed by rollers 13,14 runs vertically between the latter, the lower end of the element being butt-welded to the upper horizontal surface of element 17d.

Finally, another arm 23d, also consisting of two flat-bar elements spaced transversely one from the other, is arranged vertically, the lower end thereof being welded to the rear part of the upper horizontal surface of element 17d.

It will be understood that this assembly constitutes one longitudinal member on one side of the vehicle chassis, and that another similar longitudinal member may be fitted to the other side of the chassis, in order to secure satisfactory longitudinal bracing of the lower parts of these sides.

Furthermore, each of these longitudinal members may be equipped with coupling means, for example such as those described in the aforesaid patent, and it will be recalled that known means for displacing the longitudinal members vertically may be provided on the straddle-truck, in order to attach various pieces of equipment defined hereinafter (by coupling operations described in detail in the said patent).

Devices of greater or lesser length, such as transportation containers, fertiilizer tanks, or tanks for anti-cryptogamic products, may be coupled at various heights to elements 15d and to arms 23d, in order to move them along a row in a cultivated field.

Hoeing ploughs, gang-seeders, etc., the width of which is greater than that of the straddle-chassis, may be engaged transversely below elements 15d, between the front and rear wheels, being thus underslung in relation to the chassis; the use of such implements is facilitated in general, by the fact that the longitudinal members are adjustable in height.

Ploughs may be arranged between the front and rear wheels, and suspended from elements 15d, for the purpose of working between the furrows in a planted field. In this connection, "composite arms" 20d,21d, and even 23d, may have transverse holes to which are hinged levers for assembling or adjustting implements, it being desirable for the levers to be located between bar elements 18,19.

Finally, the underslung longitudinal elements (element 17d and the lower part of element 16d) make it possible to attach devices, the use of which requires a low position, as described in the aforesaid patent.

In this connection, it should be noted that the vertical distance between elements 15d and 17d may vary in accordance with the heights of the devices to be coupled to the vehicle. Moreover, in certain cases, element 15d could be in the form of an extension to element 17d, thus forming a single, straight, longitudinal member integral with the lower part of steering arm 16d.

Finally, the coupling and height adjustment of devices coupled to the vehicle may be achieved, without changing the attitudes of the devices, by synchronizing the means of displacement such as those described in the aforesaid patent.

Figure 5:
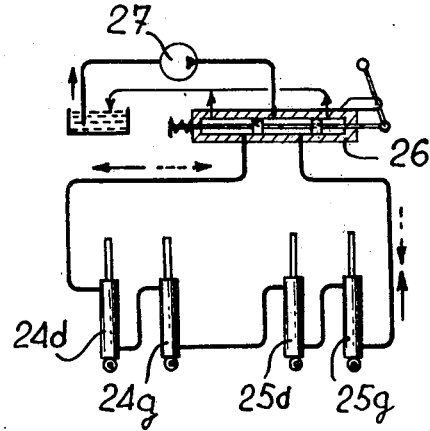
FIG. 5 is a diagram of a mechanism applicable to the longitudinal member of the tractor in FIG. 1.

As shown in FIG. 5, it is also possible to use double-acting jacks, which have two rod chambers and are therefore identical, and which are connected in series in a feed circuit comprising a conventional reversing valve 26, for the purpose of purging the circuit, and which are connected to a pressurized source of hydraulic fluid 27 fitted to the straddle truck, the lower chamber of each jack being connected to the upper chamber of another jack, and the upper and lower chambers of the first and fourth jacks being connected to the valve 26.

What is claimed is:

1. A device adapted to be mounted on each side frame of a straddle-chassis tractor having front and rear wheel-supporting legs having their upper portion braced by longitudinally extending means, comprising: support means fixedly attached to front and rear portions of each said side frame; guide means mounted to said support means; a longitudinally extending member bracing the lower portion of each side frame; and slide means on said member in sliding engagement with said guide means and cooperating therewith to allow said member to be raised and lowered relative to said side frame to thereby allow the attachment of implements to said tractor.

2. A device as defined in claim 1, wherein said member includes a profiled portion having a length corresponding to the space extending between the front and rear legs of said side frame whereby said profiled portion may extend longitudinally between said legs at various heights from a plane that includes the lower extremities of said legs.

3. A device as defined in claim 2, wherein said member includes a second profiled portion located below and on each side of a rear leg, said second portion being connected to said first profiled portion by at least one arm portion; said second profiled portion being integral with a second arm portion extending vertically behind said rear leg and in the longitudinal plane of its associated side frame to allow the attachment of raised coupling means thereto.

4. A device as defined in claim 3, wherein each of said arm portions includes two elements extending in a direction parallel to said longitudinal plane; said elements being spaced transversely from each other to accommodate levers for adjusting said implements.

5. A device as defined in claim 1, wherein said support means fixed to the front portion of said side frame include a profiled portion fixed to the front upper portion of said side frame, said profiled portion extending above the front wheel axis associated with said frame; said support means further including a strut integral with said profiled portion and fixed to the lower portion of said leg.

* * * * *